United States Patent
Satoh et al.

(10) Patent No.: US 7,372,656 B2
(45) Date of Patent: May 13, 2008

(54) DISK DRIVE WITH SIDE ERASE CONTROL

(75) Inventors: Naoki Satoh, Kanagawa (JP); Hiroyuki Tsuchinaga, Tokyo (JP); Terumi Takashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 198 days.

(21) Appl. No.: 11/404,978

(22) Filed: Apr. 13, 2006

(65) Prior Publication Data

US 2006/0232888 A1    Oct. 19, 2006

(30) Foreign Application Priority Data

Apr. 13, 2005   (JP)   ............... 2005-115682

(51) Int. Cl.
    *G11B 15/18*   (2006.01)
(52) U.S. Cl. ...................................... 360/69
(58) Field of Classification Search ............ 360/69, 360/70, 75, 125, 126, 122; 369/13.25; 29/603.07, 29/603.13
    See application file for complete search history.

(56) References Cited

U.S. PATENT DOCUMENTS

| | | | |
|---|---|---|---|
| 5,200,934 A * | 4/1993 | Mansuripur | 369/13.25 |
| 5,798,897 A * | 8/1998 | Chang et al. | 360/126 |
| 6,122,144 A * | 9/2000 | Chang et al. | 360/122 |
| 6,185,063 B1 | 2/2001 | Cameron | |
| 6,525,904 B1 * | 2/2003 | Sasaki | 360/126 |
| 6,813,116 B2 * | 11/2004 | Nakamura et al. | 360/125 |
| 6,891,697 B2 * | 5/2005 | Nakamura et al. | 360/125 |
| 6,995,949 B2 * | 2/2006 | Nakamura et al. | 360/125 |
| 7,181,827 B2 * | 2/2007 | Kamijima | 29/603.07 |
| 7,206,166 B2 * | 4/2007 | Notsuke et al. | 360/122 |
| 7,219,414 B2 * | 5/2007 | Watabe et al. | 29/603.13 |
| 2004/0042118 A1 | 3/2004 | Notsuke et al. | |
| 2004/0223257 A1 * | 11/2004 | Santini | 360/125 |
| 2006/0012914 A1 * | 1/2006 | Matono | 360/126 |

FOREIGN PATENT DOCUMENTS

| | | |
|---|---|---|
| JP | 07-021713 | 1/1995 |
| JP | 11-066725 | 3/1999 |
| JP | 2001-101633 | 4/2001 |
| JP | 2004-227735 | 8/2004 |

* cited by examiner

*Primary Examiner*—Fred F. Tzeng
(74) *Attorney, Agent, or Firm*—Towsend and Townsend and Crew LLP; Darren Gold

(57) ABSTRACT

Embodiments of the invention provide a disk drive that is capable of effectively controlling a side erase, which is one of the problems with the use of the perpendicular recording technology. In one embodiment, tracks on a recording medium are formed concentrically or spirally by overwriting a primary side track, which is either an inner track or outer track, onto part of a secondary side track, which is on the side away from the primary side track. A head unit is installed so that a magnetic head positioned at one end of the head unit relatively may move over the recording medium and that the yaw angle prevailing at an end track of the primary side on the recording medium may be substantially zero.

20 Claims, 5 Drawing Sheets

Direction of recording medium rotation

DISK DRIVE WITH SIDE ERASE CONTROL

CROSS-REFERENCES TO RELATED APPLICATIONS

This application claims priority from Japanese Patent Application No. JP2005-115682, filed Apr. 13, 2005, the entire disclosure of which is incorporated herein by reference.

BACKGROUND OF THE INVENTION

The present invention relates to a disk drive such as a hard disk drive.

In recent years, a perpendicular recording technology for recording information by magnetizing a recording medium in a direction perpendicular to a plane has been highlighted as a technology for increasing the hard disk recording density. When the perpendicular recording technology is used, the so-called side erase needs to be controlled in order to improve the magnetic head recording performance. The side erase is a phenomenon in which a magnetic head overwrites information not only onto a target track but also onto a neighboring track. One reason is that a magnetic field reaches the neighboring track when the head yaw angle is not zero.

A technology for controlling the occurrence of the above phenomenon is disclosed, for instance, by Patent Document 1 (Japanese Patent JP-A No. 2004-94997). This technology changes the shape of a magnetic pole in a write head.

Meanwhile, a technology for increasing the recording density is disclosed, for instance, by Patent Document 2 (U.S. Pat. No. 6,185,063). This technology records tracks in a manner similar to shingling while sequentially performing a partial overwrite with a neighboring track, beginning, for instance, from an inner track and continuing with outer tracks. This ensures that the widths of the resultant tracks are smaller than the actual write widths of a magnetic head.

BRIEF SUMMARY OF THE INVENTION

As described above, various methods were proposed for increasing the hard disk recording density.

The present invention has been made in view of the above circumstances. It is a feature of the present invention to provide a disk drive that is capable of effectively controlling the side erase, which represents the problem to be solved when the perpendicular recording technology is used.

In solving the above problem, there is provided a disk drive comprising a perpendicular recording medium on which concentric or spiral tracks are formed; a control section for overwriting a primary side track, which is either an inner track or outer track on the perpendicular recording medium, onto part of a secondary side track, which is on the side away from the primary side track; and a head unit that turns on a central shaft of voice coil motor, wherein a perpendicular magnetic head mounted at one end of the head unit relatively moves over the perpendicular recording medium, and wherein a yaw angle prevailing at the end track of the primary side on the perpendicular recording medium is substantially zero.

DETAILED DESCRIPTION OF THE INVENTION

Figure 1:
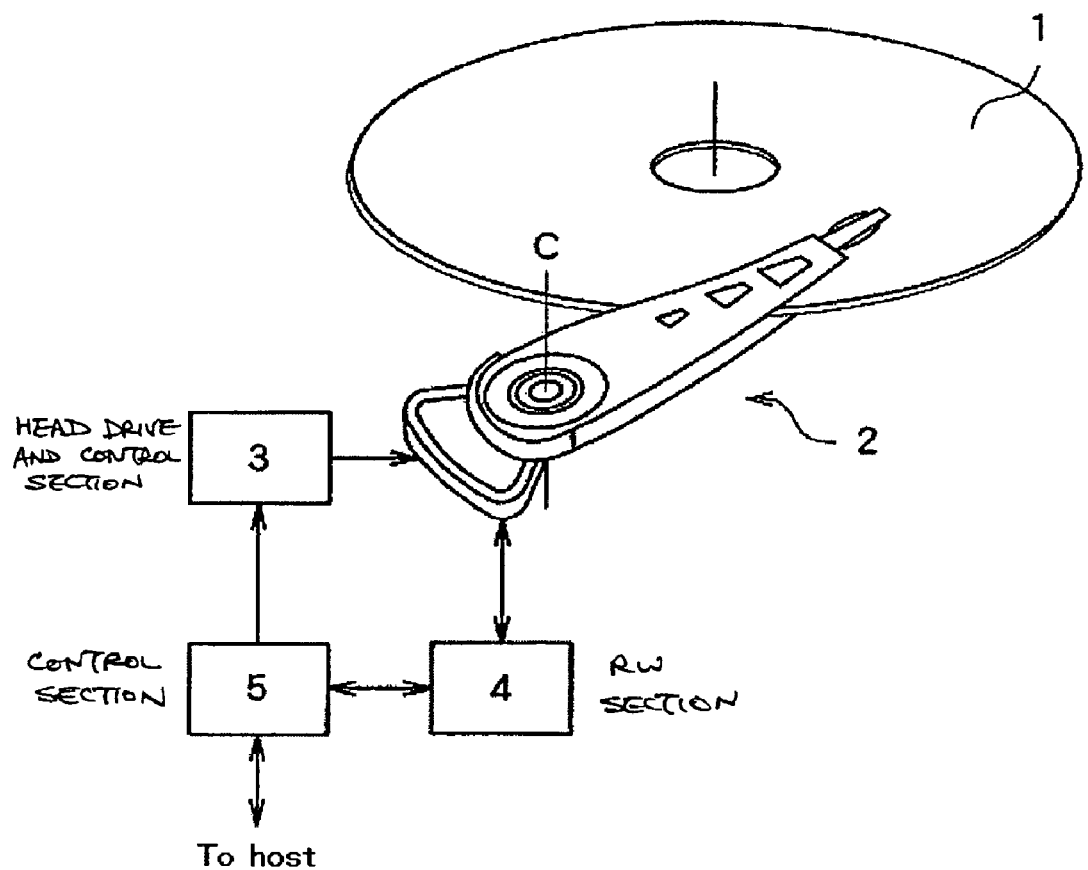
FIG. 1 is a schematic diagram illustrating a disk drive according to one embodiment of the present invention.

Embodiments of the present invention will now be described with reference to the accompanying drawings. A disk drive according to an embodiment of the present invention is, for example, a hard disk drive, which includes a recording medium 1, a head unit 2, a head drive and control section 3, a read/write (RW) section 4, and a control section 5, as indicated in FIG. 1.

Figure 2:
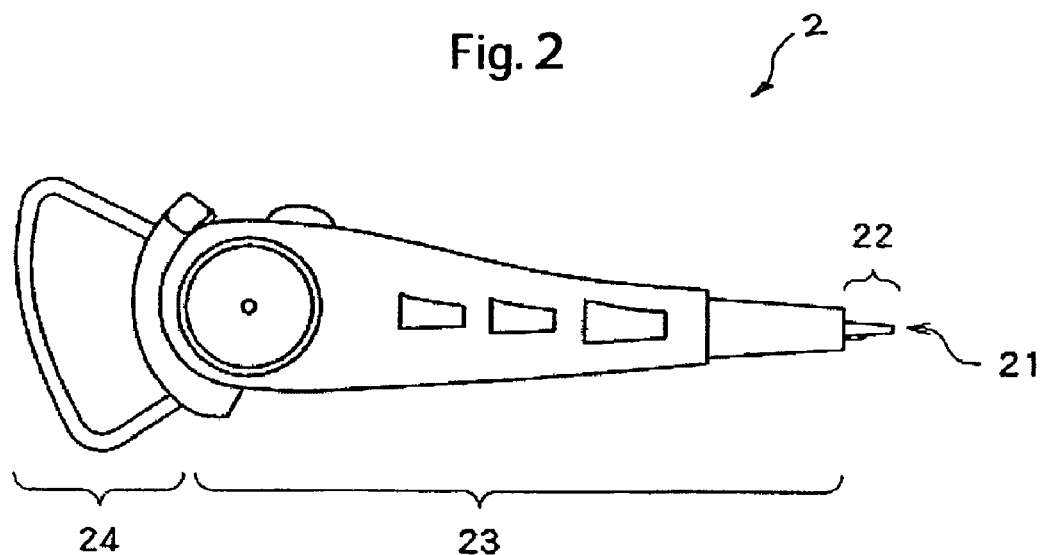
FIG. 2 is a schematic diagram illustrating a head unit according to one embodiment of the present invention.

Included in the recording medium 1, from the surface layer side to the bottom layer side, are: a perpendicular recording layer, a soft magnetic layer, and a base layer. The recording medium 1 is designed for perpendicular recording. The recording medium 1 is supported in a rotatable manner and fastened to a housing base. As outlined in FIG. 2, the head unit 2 includes heads 21, which relate to the recording surfaces of the recording medium 1, a slider 22 and an arm 23, which support each head 21, and a voice coil motor 24. The head unit 2 is supported in such a manner that it can pivot on the rotation center C of the voice coil motor 24.

In compliance with instructions from the control section 5, the head drive and control section 3 drives the voice coil motor 24 of the head unit 2 to control the positions of the heads 21. The RW section 4 performs a decoding or other process on information that a read head, which is contained in a head 21, reads from the recording medium 1, and outputs the resulting processed information to the control section 5. Further, the RW section 4 performs an encoding or other process on write information, which is input from the control section 5, and writes the information onto the recording medium 1 via a write head, which is contained in the head 21.

The control section 5 is connected to a computer or other apparatus that functions as a host. In compliance with instructions from the host, the control section 5 instructs the head drive and control section 3 to move the head 21 to a location where the information requested by the host is recorded. The control section 5 also outputs to the host the information that is output from the RW section 4. Further, in compliance with a write request from the host, the control section 5 instructs the head drive and control section 3 to move the head 21 to a location where information is to be written. In addition, the control section 5 outputs write information, which is to be written, to the RW section 4.

Furthermore, the control section 5 concentrically forms information write tracks on a surface of the recording medium 1. In this instance, the control section 5 performs a shingled writing, by overwriting a primary side track, which is either an inner track or outer track on the recording medium 1, onto part of a secondary side track, which is on the side away from the primary side track. A typical shingled writing, in which part of the primary outer track is overwritten by a neighboring secondary inner track, will now be described.

When performing a seek to locate a neighboring track at the time of an information write, the control section 5 moves the write head by a track pitch SWP that is smaller than the write head's write width W (track width that excludes the side erase and is provided by the write head).

Figure 3:
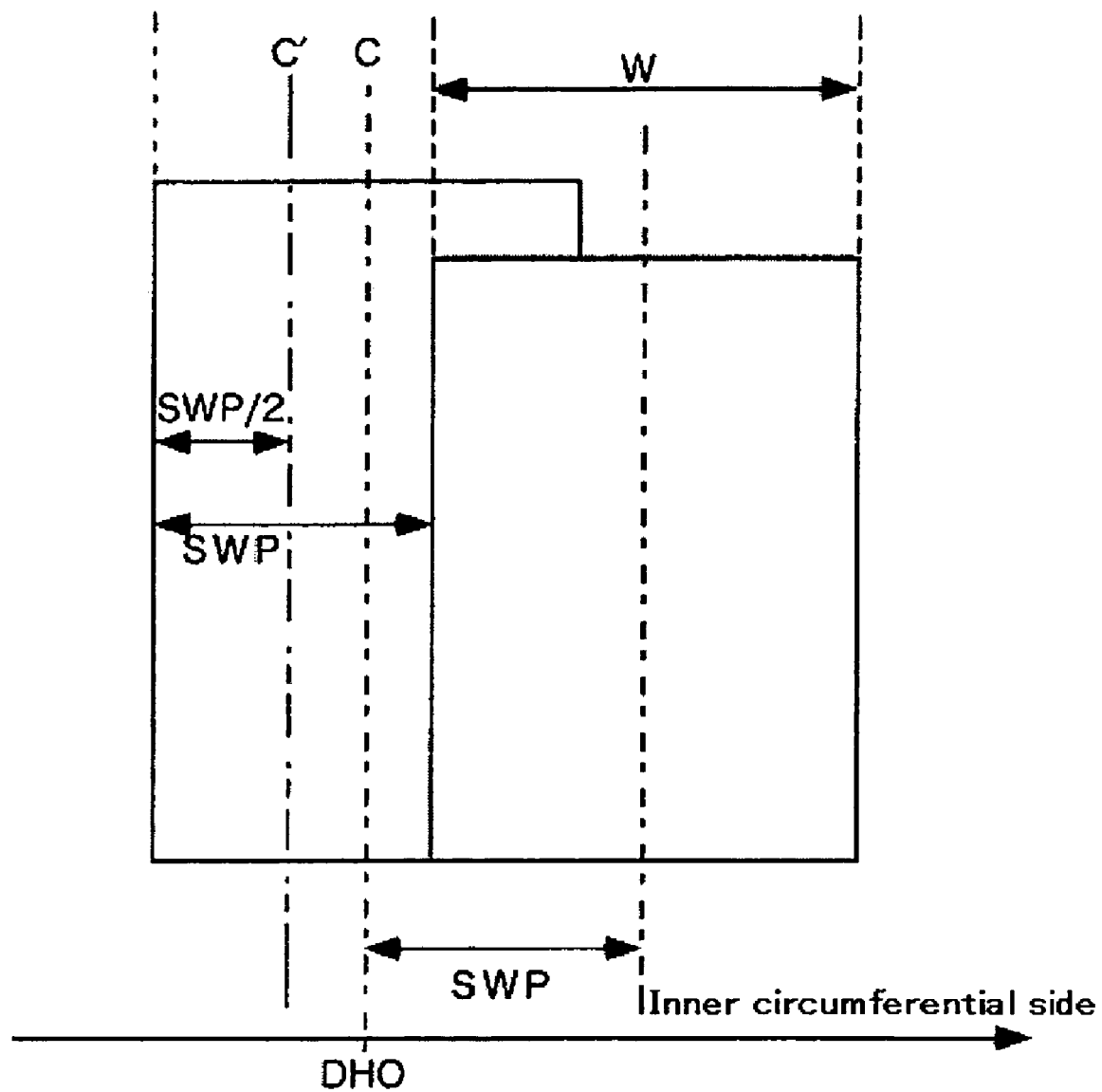
FIG. 3 illustrates a typical head position control operation that is performed for a shingled writing.

If, under the above circumstance, the center of the read head is moved to the position DHO of the write head center C for an information write onto the track to be read, as indicated in FIG. 3, the information written onto an overwritten neighboring track becomes noise. At the time of a read, therefore, the control section 5 moves the read head to a location that is shifted outward from the DHO by half the write width W, that is, by W/2, and then shifted inward by half the track pitch SWP, that is, by SWP/2 (DHO−W/2+SWP/2).

If the write width W is unknown, the offset from the write head center position DHO for a write (ideally the value providing—W/2+SWP/2) is determined from a minimum error rate condition that prevails during an actual read. In other words, the control section 5 tries to read information in each step while sequentially moving the magnetic head to the center position DHO in predetermined steps from, for instance, a position to which the read head is moved outward from the center position DHO by the track pitch SWP. As a result of such a trial, the error rate is minimized at an ideal position C'. The position at which the error rate is minimized is therefore stored as the offset table.

When reading a specified track, the control section 5 moves the read head to a position that is corrected by the stored offset in relation to the position DHO of the write head center C for an information write onto the specified track. The control section 5 then reads data from the track, receives a data input from the RW section 4, and outputs the received data input to the host.

The DHO is defined with reference to the magnetic head position for a write (write element position). However, if the magnetic head position for a read (read element position) can be determined, for instance, from servo information, the DHO may be defined with reference to the read element position. In such an instance, the magnetic head position for a write is offset from the DHO, which is based on the read element position, to DHO+W/2−SWP/2.

In the present embodiment, the write head angle for the primary write side end (primary lateral end or an end track of the primary side) for a shingled writing on the recording medium is determined as described below in relation to the shingled writing direction of the control section 5. In other words, installation is performed so that the yaw angle may be substantially zero when the write head is positioned at the primary lateral end.

Figure 4:
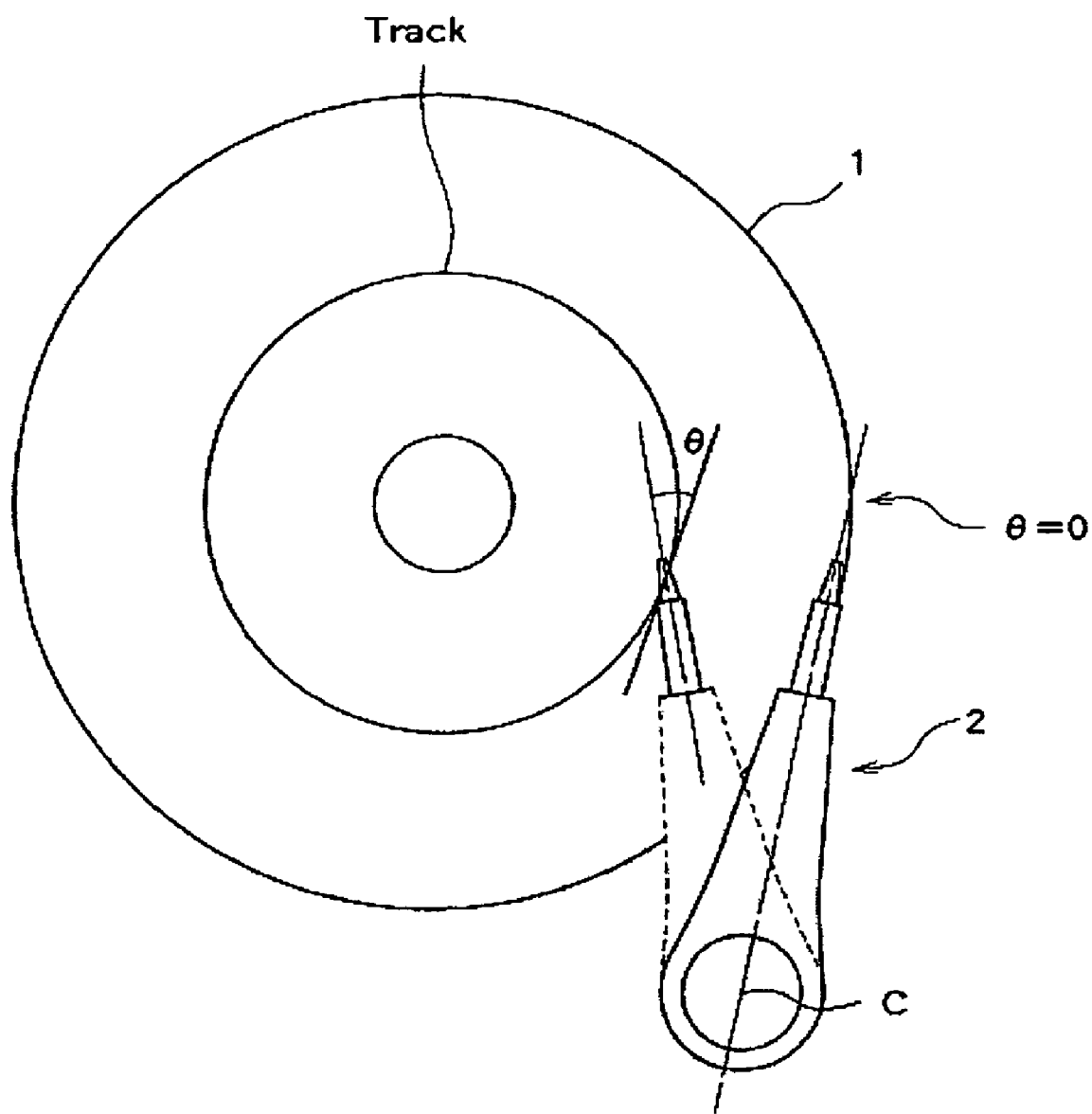
FIG. 4 illustrates a typical yaw angle setup operation in a disk drive according to one embodiment of the present invention.

A case where the outer circumferential side of the recording medium 1 is the primary side will now be described. As indicated in FIG. 4, the head 21 and slider 22 are fastened to the arm 23 or the position of the rotation center C of the head unit 2 is determined so that the yaw angle θ prevailing at an outer circular end may be substantially zero. The yaw angle θ is an angle that is formed between the track tangent and the center line of the arm 23, which passes through the rotation center C of the head unit 2.

Under the above circumstance, the yaw angle is not zero when the head 21 performs a write on an inner track, thereby incurring a side erase, which magnetically affects a neighboring track. More specifically, a side erase occurs to affect an inner track, that is, a side erase occurs toward the rotation center of the recording medium 1. In the present embodiment, the inner part of an outer track is overwritten by a neighboring track. Therefore, a side-erased portion is also overwritten by the neighboring track so that no substantial side erase occurs.

Figure 5:
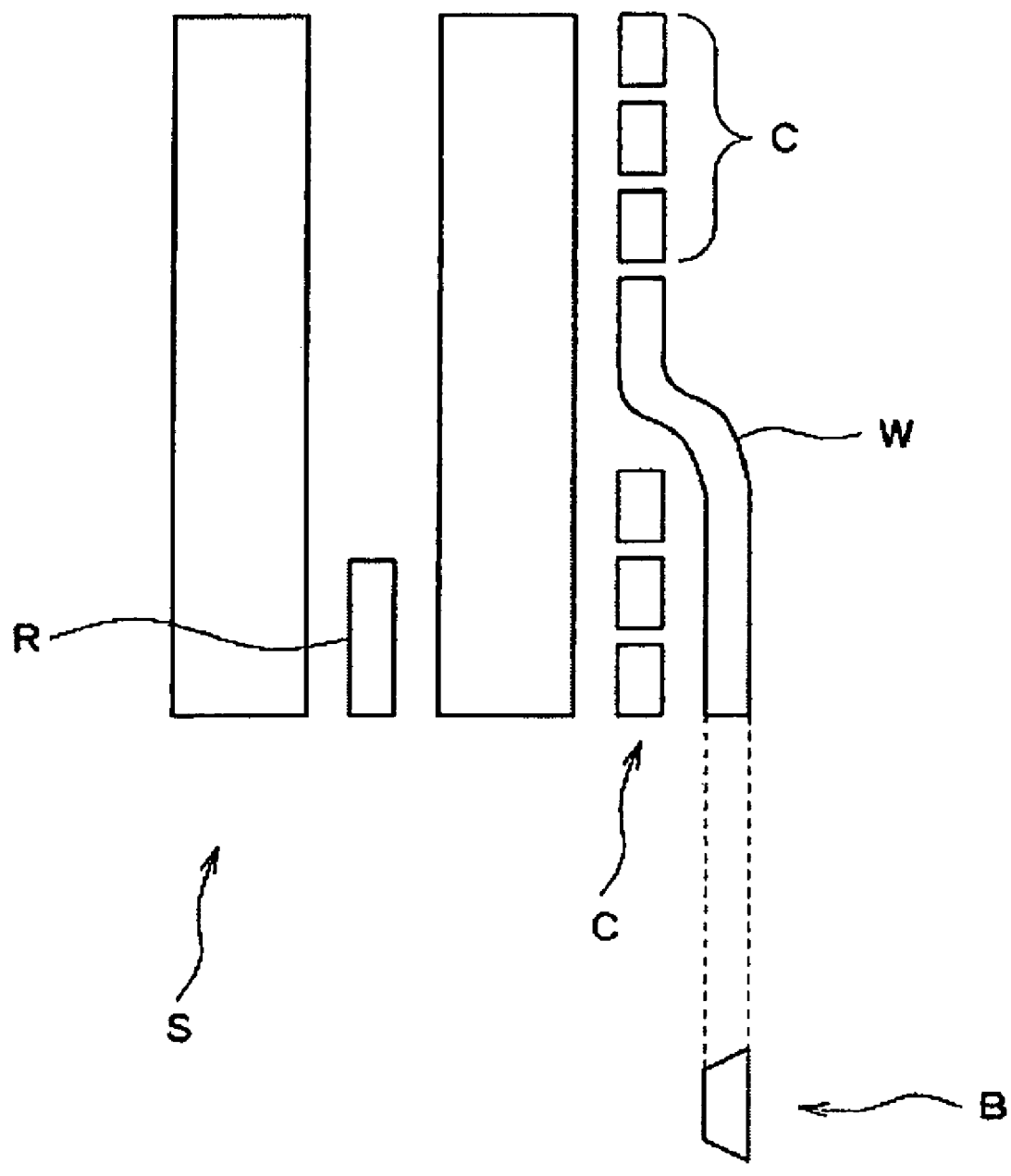
FIG. 5 illustrates a typical magnetic head shape of a disk drive according to one embodiment of the present invention.

Similarly, when a shingled writing is oriented so that the inner circular side of the recording medium may serve as the primary side, the head 21 and slider 22 are fastened to the arm 23 or the position of the rotation center C of the head unit 2 is determined so that the yaw angle θ is substantially zero at the inner circular end as indicated in FIG. 5.

In the above instance, the air bearing surface view of the main magnetic pole piece of the write head in the head 21 may be rectangular because no substantial side write occurs.

As described above, however, the yaw angle is maximized at the secondary lateral end of the recording medium 1 at which a shingled writing is performed later. To minimize the side write at the secondary lateral end, the write head main magnetic pole piece may be rendered trapezoidal and increasing in width in the rotation direction of the recording medium 1 as indicated in FIG. 5. FIG. 5 presents a side view (S) of the magnetic head main magnetic pole piece W and an air bearing surface view (air bearing surface shape, B) of the magnetic head main magnetic pole piece W. In the side view in FIG. 5, symbol R denotes the read head whereas symbol C denotes a coil.

In the present embodiment, the recording medium 1 is formatted so that a shingled writing can be performed in the same direction on both surfaces of the recording medium 1. Formerly, the employed format was such that LBAs (Logical Block Addresses) were sequentially assigned, for instance, beginning with the circular outer end of a recording medium surface, and that the LBAs were then sequentially assigned from the inner circular side to the outer circular side, in reverse order, beginning with a track on the back surface of the recording medium, when the 64th track is reached.

Figure 6:
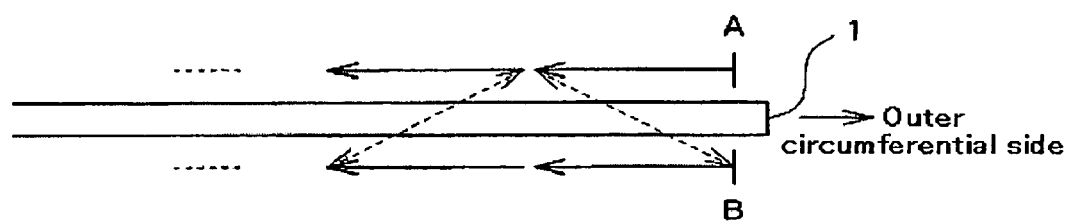
FIG. 6 illustrates a typical format for use with a disk drive according to one embodiment of the present invention.

In the present embodiment, however, it is necessary to define the direction of a shingled writing. Therefore, the LBAs are assigned from the outer circular side to the inner circular side for both surfaces. For example, as shown in FIG. 6, the LBAs are sequentially assigned from track A on the outer circumferential side on the front surface of the recording medium. When the 64th track is reached, the LBAs are sequentially assigned from track B on the back surface of the recording medium, which corresponds to track A on the front surface, toward the inner circumferential side (that is, after a 64-track backward shift). On the back surface, the LBAs are further assigned until the 128th track is reached. After a return to the front surface of the recording medium, the LBAs are continuously assigned subsequently to a 64-track backward shift. When the LBAs are assigned in this manner, a seek is performed upon a head change.

Figure 7:
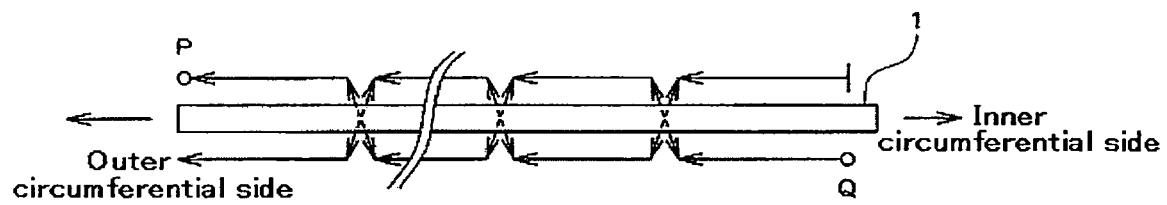
FIG. 7 illustrates another typical format for use with a disk drive according to one embodiment of the present invention.

In another example, which is shown in FIG. 7, the LBAs are sequentially assigned beginning with a track on the outer circumferential side of the front surface of the recording medium. When the 64th track A is reached, the LBAs are then assigned from track B on the back surface of the recording medium, which corresponds to track A, toward the inner circumferential side. When the innermost circular end is reached (P), a long seek is performed to return to the outermost circular end (Q) so that the LBAs are continuously assigned. FIG. 7 assumes that the number of formed tracks is an odd multiple of 64. Therefore, the surface is changed at the time of a long seek. However, if the number of formed tracks is an even multiple of 64, the surface change does not take place at the time of a long seek.

The present embodiment makes use of a shingled writing technology to effectively control a side erase, which is one of the problems with the use of the perpendicular recording technology.

The foregoing description assumes that the tracks are concentrically arranged. However, the present invention can also be applied to a case where the tracks are spirally arranged.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
a perpendicular recording medium on which concentric or spiral tracks are formed;
a control section configured to overwrite a primary side track, which is either an inner track or an outer track on the perpendicular recording medium, onto part of a secondary side track, which is on the side away from the primary side track; and
a head unit that turns on a central shaft, wherein a perpendicular magnetic head positioned at one end of the head unit relatively moves over the perpendicular recording medium, and wherein a yaw angle prevailing at an end track of the primary side on the perpendicular recording medium is substantially zero.

2. The disk drive according to claim 1, wherein an air bearing surface view of a main magnetic pole piece of a write head is rectangular.

3. The disk drive according to claim 1, wherein an air bearing surface view of a main magnetic pole piece of a write head is trapezoidal and increasing in width in the rotation direction of the recording medium.

4. The disk drive according to claim 1, wherein the perpendicular recording medium is formatted so that the overwriting by the control section can be performed in the same direction on both surfaces of the perpendicular recording medium.

5. The disk drive according to claim 1, wherein logical block addresses are assigned from an outer circular side to an inner circular side for both surfaces of the perpendicular recording medium.

6. The disk drive according to claim 1, wherein when performing a seek to locate a neighboring track at the time of an information write, the control section moves a write head of the head unit by a track pitch that is smaller than a write width of the write head.

7. The disk drive according to claim 6, wherein at the time of a read, the control section moves a read head of the head unit to a location that is shifted outward from the write head center position of the write head by half the write width of the write head, and then shifted inward by half the track pitch.

8. The disk drive according to claim 1, wherein at the time of a read, the control section moves a read head of the head unit to a location that is shifted outward from a write head center position of a write head of the head unit by half a write width of the write head, and then shifted inward by half a track pitch, the track pitch being smaller than the write width.

9. The disk drive according to claim 8, wherein if the write width is unknown, the read head is shifted from the write head center position by an offset determined from a minimum error rate condition that prevails during an actual read.

10. The disk drive according to claim 9, wherein the control section is configured to try to read information in each step while sequentially moving the read head to the write head center position in predetermined steps from a position to which the read head is moved outward from the center position by the track pitch, so as to identify the minimum error ate conditions and determine the offset at the minimum error rate condition.

11. A disk drive comprising:
a perpendicular recording medium on which concentric or spiral tracks are formed;
means for overwriting a primary side track, which is either an inner track or an outer track on the perpendicular recording medium, onto part of a secondary side track, which is on the side away from the primary side track; and
a head unit that turns on a central shaft, wherein a perpendicular magnetic head positioned at one end of the head unit relatively moves over the perpendicular recording medium, and wherein a yaw angle prevailing at the end track of the a primary side on the perpendicular recording medium is substantially zero.

12. The disk drive according to claim 11, wherein the air bearing surface view of a main magnetic pole piece of a write head is rectangular.

13. The disk drive according to claim 11, wherein the air bearing surface view of a main magnetic pole piece of a write head is trapezoidal and increasing in width in the rotation direction of the recording medium.

14. The disk drive according to claim 11, wherein the perpendicular recording medium is formatted so that the overwriting by the means can be performed in the same direction on both surfaces of the perpendicular recording medium.

15. The disk drive according to claim 11, wherein logical block addresses are assigned from an outer circular side to an inner circular side for both surfaces of the perpendicular recording medium.

16. The disk drive according to claim 11, further comprising, when performing a seek to locate a neighboring track at the time of an information write, moving means for moving a write head of the head unit by a track pitch that is smaller than a write width of the write head.

17. The disk drive according to claim 16, wherein at the time of a read, the moving means moves a read head of the head unit to a location that is shifted outward from the write head center position of the write head by half the write width of the write head, and then shifted inward by half the track pitch.

18. The disk drive according to claim 11, further comprising, at the time of a read, moving means for moving a read head of the head unit to a location that is shifted outward from a write head center position of a write head of the head unit by half a write width of the write head, and then shifted inward by half a track pitch, the track pitch being smaller than the write width.

19. The disk drive according to claim 18, wherein if the write width is unknown, the read head is shifted from the write head center position by an offset determined from a minimum error rate condition that prevails during an actual read.

20. The disk drive according to claim 19, wherein the moving means tries to read information in each step while sequentially moving the read head to the write head center position in predetermined steps from a position to which the read head is moved outward from the center position by the track pitch, so as to identify the minimum error ate conditions and determine the offset at the minimum error rate condition.

* * * * *